(12) United States Patent
Kim et al.

(10) Patent No.: US 11,356,375 B2
(45) Date of Patent: Jun. 7, 2022

(54) ELECTRONIC DEVICE AND METHOD FOR CONTROLLING DATA TRANSMISSION

(71) Applicant: Samsung Electronics Co., Ltd., Gyeonggi-do (KR)

(72) Inventors: Jihwan Kim, Gyeonggi-do (KR); Junsuk Kim, Gyeonggi-do (KR); Wonsuk Chung, Gyeonggi-do (KR); Hyejeong Kim, Gyeonggi-do (KR); Sangho Lee, Gyeonggi-do (KR); Minjung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 16/851,386

(22) Filed: Apr. 17, 2020

(65) Prior Publication Data

US 2020/0336430 A1    Oct. 22, 2020

(30) Foreign Application Priority Data

Apr. 19, 2019    (KR) .......................... 10-2019-0046164

(51) Int. Cl.
*H04L 47/2425* (2022.01)
*H04L 47/70* (2022.01)
*H04L 45/02* (2022.01)

(52) U.S. Cl.
CPC .......... *H04L 47/2433* (2013.01); *H04L 45/02* (2013.01); *H04L 47/82* (2013.01)

(58) Field of Classification Search
CPC ..... H04L 47/2433; H04L 47/82; H04L 45/02; H04L 47/2475
See application file for complete search history.

(56) References Cited

U.S. PATENT DOCUMENTS

| 10,440,096 B2 | 10/2019 | Sabella et al. |
| 11,050,813 B2 | 6/2021 | Sabella et al. |

(Continued)

FOREIGN PATENT DOCUMENTS

| WO | 2012/092935 A1 | 7/2012 |
| WO | 2019/061110 A1 | 4/2019 |

OTHER PUBLICATIONS

International Search Report dated Aug. 11, 2020.
European Search Report dated May 9, 2022.
Generation Partnership Project dated Dec. 19, 2018.

*Primary Examiner* — Jung H Park
(74) *Attorney, Agent, or Firm* — Cha & Reiter, LLC.

(57) ABSTRACT

The electronic device, comprises a communication circuitry configured to exchange data with an external electronic device; a first processor configured to exchange data with the external electronic device via the communication circuitry; a second processor configured to control the communication circuitry; and a memory configured to store priority information for each path characteristic of paths established over a network, wherein a first one of the first processor and the second processor is configured to: identify at least one priority information mapped to the path characteristic information based on the priority information in the memory; and store priority related information based on the at least one priority information, and wherein a second one of the first processor and the second processor is configured to: transmit data corresponding to the service identification information to the first one of the first processor and the second processor based on the priority related information.

20 Claims, 7 Drawing Sheets

(56) References Cited

U.S. PATENT DOCUMENTS

| | | |
|---|---|---|
| 2007/0002748 A1 | 1/2007 | Nakata et al. |
| 2011/0255409 A1 | 10/2011 | Uramoto et al. |
| 2011/0317560 A1 | 12/2011 | Uramoto et al. |
| 2014/0233388 A1 | 8/2014 | Uramoto et al. |
| 2018/0183855 A1 | 6/2018 | Sabella et al. |
| 2018/0213579 A1 | 7/2018 | Hong et al. |
| 2019/0174449 A1* | 6/2019 | Shan ..................... H04W 60/00 |
| 2020/0092790 A1* | 3/2020 | Salkintzis ............. H04L 45/306 |
| 2022/0078226 A1 | 3/2022 | Sabella et al. |

* cited by examiner

ELECTRONIC DEVICE AND METHOD FOR CONTROLLING DATA TRANSMISSION

CROSS-REFERENCE TO RELATED APPLICATION(S)

This application is based on and claims priority under 35 U.S.C. § 119 to Korean Patent Application No. 10-2019-0046164, filed on Apr. 19, 2019, in the Korean Intellectual Property Office, the disclosure of which is incorporated by reference herein its entirety.

BACKGROUND

1. Field

The disclosure relates to technologies of controlling data transmission.

2. Description of Related Art

An electronic device may transmit and receive data with another electronic device (e.g., a service server) over a network (e.g., a router). A network system may differentially control data transmission quality of the electronic device depending on a specified policy. For example, the network may transmit and receive data of an electronic device configured to have high quality of service (QoS) at a faster transmission rate.

The above information is presented as background information only to assist with an understanding of the present disclosure. No determination has been made, and no assertion is made, as to whether any of the above might be applicable as prior art with regard to the present disclosure.

SUMMARY

In accordance with an aspect of the disclosure, an electronic device, comprises a communication circuitry configured to transmit and receive data with an external electronic device over a network; a first processor configured to transmit and receive data with the external electronic device via the communication circuitry; a second processor configured to be operatively connected with the communication circuitry and the first processor and control the communication circuitry; and a memory configured to store priority information for each path characteristic of paths established over the network, wherein the second processor is configured to: identifying path characteristic information about a transmission path and/or service identification information about a service using the transmission path and storing priority information for each path characteristic of the transmission path in the memory when the transmission path connected with the external electronic device is established over the network, wherein a first one of the first processor and the second processor is configured to: identify at least one priority information mapped to the path characteristic information, based on the priority information for each path characteristic in the memory; and store priority related information for determining a data transmission order corresponding to the transmission path based on the at least one priority information, and wherein a second one of the first processor and the second processor is configured to: transmit data corresponding to the service identification information to the first one of the first processor and the second processor based on the priority related information.

In accordance with another aspect of the disclosure, a method for controlling data transmission between a first processor and a second processor is provided. The method may comprise: when a transmission path connected with an external electronic device is established over a network, identifying, by the second processor, path characteristic information about the transmission path and service identification information about a service using the transmission path; identifying, by a first one of the first processor and the second processor, at least one priority information mapped to the path characteristic information, based on priority information for each path characteristic, the priority information being stored in a memory; storing, by the first one of the first processor and the second processor, priority related information for determining a data transmission order corresponding to the transmission path based on the at least one priority information in the memory; and transmitting, by a second one of the first processor and the second processor, data corresponding to the service identification information to the data receive processor based on the priority related information.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

A $5^{th}$ generation new ratio (5G NR) network may include a plurality of transmission paths divided logically or physically for uses and purposes and may provide data transmission quality differentiated for each transmission path. Furthermore, the NR network may provide the electronic device with a user equipment (UE) selection policy (URSP) associated with data transmission quality for each transmission path.

An NR network system differentially provides data transmission quality for each transmission path based on a policy associated with the data transmission quality. However, an electronic device does not separately control data transmission quality for a transmission path.

Aspects of the disclosure are to address at least the above-mentioned problems and/or disadvantages and to provide at least the advantages described below.

Accordingly, an aspect of the disclosure may provide an electronic device for differentially controlling data transmission quality depending on characteristics of a transmission path established over a network and a method for controlling data transmission.

Figure 1:
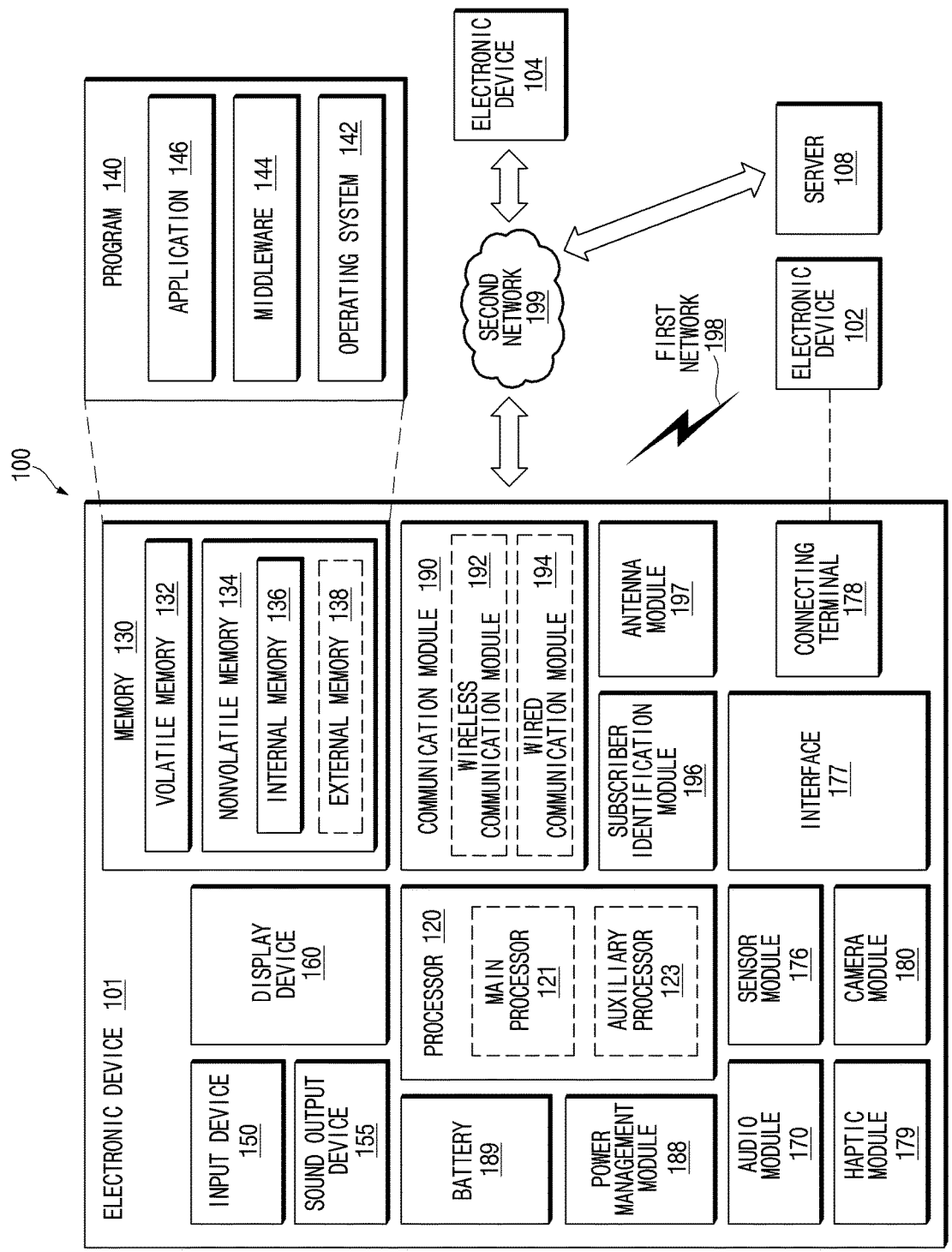
FIG. 1 is a block diagram illustrating an electronic device controlling data transmission in a network environment according to certain embodiments.

FIG. 1 is a block diagram illustrating an electronic device 101 controlling data transmission in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
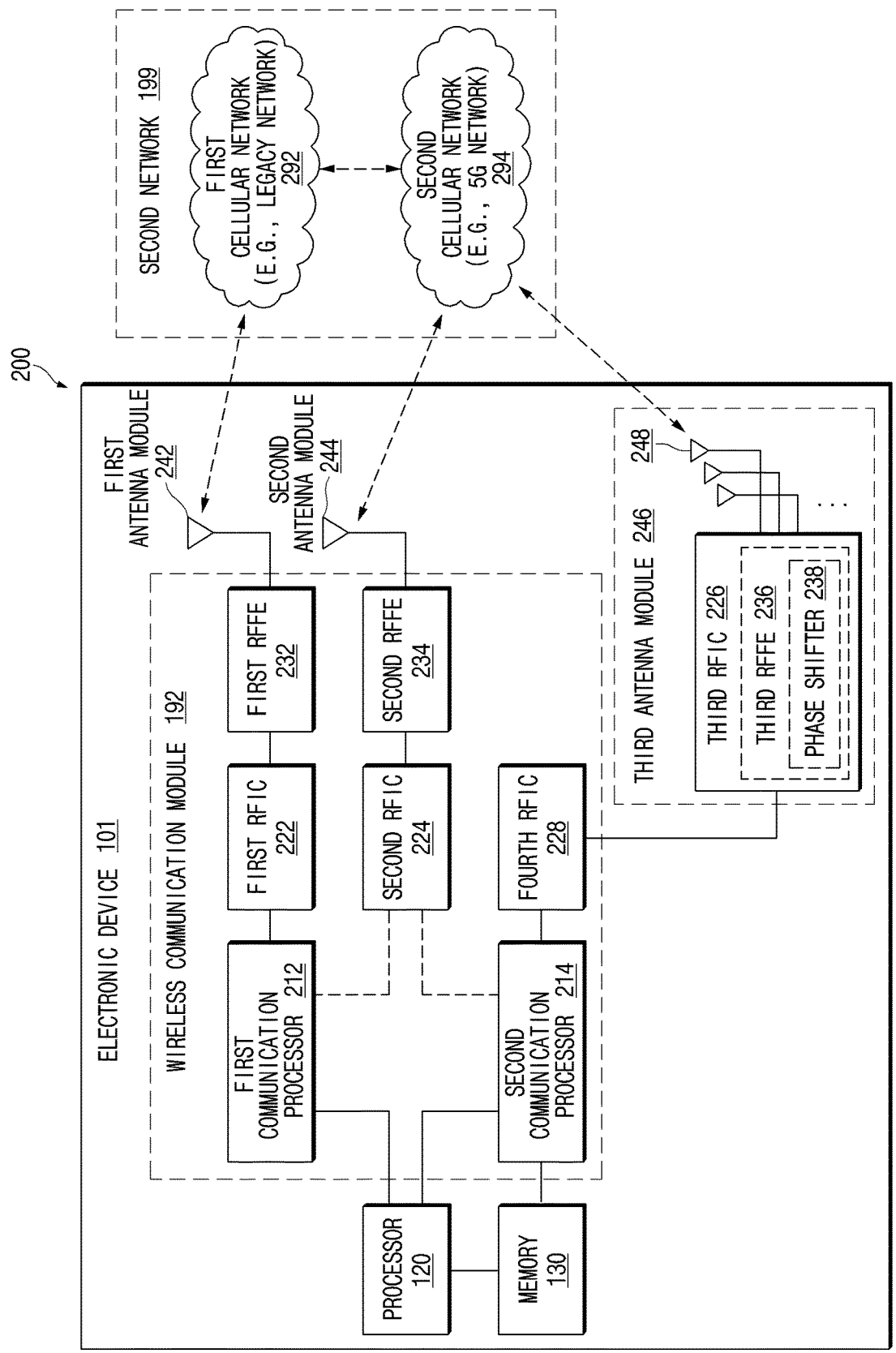
FIG. 2 is a block diagram illustrating an electronic device in a network environment including a plurality of cellular networks, according to certain embodiments.

FIG. 2 is a block diagram 200 illustrating an electronic device 101 in a network environment including a plurality of cellular networks, according to certain embodiments.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna 242, a second antenna module 244, and an antenna 248.

The electronic device 101 may further include a processor 120 and a memory 130 as well as at least one of the components shown in FIG. 1. A network 199 (which may correspond to second network 199 of FIG. 1) may include a first cellular network 292 and a second cellular network 294 as well as other networks. According to an embodiment, the first communication processor 212, the second communication processor 214, the first RFIC 222, the second RFIC 224, the fourth RFIC 228, the first RFFE 232, and the second RFFE 234 may configure at least a part of a wireless communication module 192 to transmit or receive signals from the network 199. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. The second communication processor 214 may establish a communication channel corresponding to a specified band (e.g., about 6 GHz to about 60 GHz) among bands to be used for wireless communication with the second cellular network 294 and may support $5^{th}$ generation (5G) network communication over the established communication channel. The first cellular network 292 may be a legacy network including a $2^{nd}$ generation (2G), $3^{rd}$ generation (3G), $4^{th}$ generation (4G), long term evolution (LTE) network. According to certain embodiments, the second cellular network 294 may be a 5G network defined in $3^{rd}$ generation partnership project (3GPP). In addition, according to an embodiment, the first communication processor 212 or the second communication processor 214 may establish a communication channel corresponding to another specified band (e.g., about 6 GHz or less) among bands used for wireless communication with the second cellular network 294 and may support 5G network communication over the established communication channel.

According to an embodiment, the first communication processor 212 and the second communication processor 214 may be implemented in a single chip or a single package. According to various embodiments, the first communication processor 212 or the second communication processor 214 may be configured together with the processor 120, an auxiliary processor 123 of FIG. 1, or a communication module 190 of FIG. 1 in a single chip or a single package. According to an embodiment, the first communication processor 212 and the second communication processor 214 may be directly or indirectly coupled to each other by an interface (not shown) to provide or receive data or a control signal in any single direction or in both directions.

The first RFIC 222 can convert a baseband signal for the first cellular network 292 while the second RFIC 224 can convert a baseband signal for the second cellular network 294.

Upon transmission, the first RFIC 222 may convert a baseband signal generated by the first communication processor 212 into an RF signal of about 700 MHz to about 3 GHz used for the first cellular network 292 (e.g., the legacy network). Upon reception, an RF signal may be obtained from the first cellular network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first communication processor 212.

Upon transmission, the second RFIC 224 may convert a baseband signal generated by the first communication processor 212 or the second communication processor 214 into an RF signal of a Sub6 band (e.g., about 6 GHz or less) (hereinafter referred to as "5G Sub6 RF signal") used for the second cellular network 294 (e.g., the 5G network). Upon reception, a 5G Sub6 RF signal may be obtained from the second cellular network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding communication processor between the communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter referred to as "5G Above6 RF signal") to be used in the second cellular network 294 (e.g., the 5G network). Upon reception, a 5G Above6 RF signal may be obtained from the second cellular network 294 (e.g., the 5G network) via an antenna (e.g., the antenna 248) and may be preprocessed via the third RFFE 236. The third RFIC 226 may convert the preprocessed 5G Above6 RF signal into a baseband signal to be able to be processed by the second communication processor 214. According to an embodiment, the third RFFE 236 may be configured as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter referred to as "IF signal") and may deliver the IF signal to the third RFIC 226. The third RFIC 226 may convert the IF signal into a 5G Above6 RF signal. Upon reception, a 5G Above6 RF signal may be received from the second cellular network 294 (e.g., the 5G network) via an antenna (e.g., the antenna 248) and may be converted into an IF signal by the third RFIC 226. The fourth RFIC 228 may convert the IF signal into a baseband signal to be able to be processed by the second communication processor 214.

According to an embodiment, the first RFIC 222 and the second RFIC 224 may be implemented as at least a part of a single chip or a single package. According to an embodiment, the RFFE 232 and the second RFFE 234 may be implemented as at least a part of a single chip or a single package. According to an embodiment, at least one of the first antenna module 242 or the second antenna module 244 may be omitted or may be combined with another antenna module to process RF signals of a plurality of corresponding bands.

According to an embodiment, the third RFIC 226 and the antenna 248 may be arranged on the same substrate to configure the third antenna module 246. For example, the wireless communication module 192 or the processor 120 may be arranged on a first substrate (e.g., a main printed circuit board (PCB)). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. As the third RFIC 226 and the antenna 248 are arranged on the same substrate, it is possible to reduce a length of a transmission line between the third RFIC 226 and the antenna 248. This may reduce that, for example, a signal of a high frequency band (e.g., about 6 GHz to about 60 GHz) used for 5G network communication is lost (e.g., attenuated) by the transmission line. Due to this, the electronic device 101 may enhance quality or speed of communication with the second cellular network 294 (e.g., the 5G network).

According to an embodiment, the antenna 248 may be configured as an antenna array including a plurality of antenna elements which are available for beamforming. In such a case, the third RFIC 226 may include, for example, a plurality of phase shifters 238, as a part of the third RFFE 236, corresponding to the plurality of antenna elements. Upon transmission, each of the plurality of phase shifters 238 may convert a phase of a 5G Above6 RF signal to be transmitted to the outside (e.g., a base station of a 5G network) of the electronic device 101 via a corresponding antenna element. Upon reception, each of the plurality of phase shifters 238 may convert a phase of a 5G Above6 RF signal received from the outside via a corresponding antenna element into the same or substantially the same phase. This facilitates transmission or reception through beamforming between the electronic device 101 and the outside.

The second cellular network 294 (e.g., the 5G network) may be operated independently of the first cellular network 292 (e.g., the legacy network) (e.g., stand-alone (SA)) or may be connected and operated with the first cellular network 292 (e.g., the legacy network) (e.g., non-standalone (NSA)). For example, there may be only an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may access an external network (e.g., the Internet) under control of a core network (e.g., an evolved packed core (EPC)) of the legacy network. Protocol information (e.g., LIE protocol information) for communication with the legacy network or protocol information (e.g., new radio (NR) protocol information) for communication with the 5G network may be stored in the memory 130 and may be accessed by another component (e.g., the processor 120 of FIG. 1, the first communication processor 212 of FIG. 2, or the second communication processor 214 of FIG. 2).

In certain embodiments, processor 120 can be an application processor that is configured to transmit and receive data with an external electronic device via the wireless communication module 192. Any one of first communication processor 212, second communication processor 214 (now referred to as communication processor) controls the wireless communication module 192. The memory is configured to store priority information for each path characteristic of paths established over the network. The communication processor 212/214 is configured to identifying path characteristic information about a transmission path and/or service identification information about a service using the transmission path and storing priority information for each path characteristic of the transmission path in the memory 130 when the transmission path connected with the external electronic device 101 is established over the network 199. One of the processor 120 and communication processor 212/214 is configured to identify at least one priority information mapped to the path characteristic information, based on the priority information for each path characteristic in the memory; and store priority related information for determining a data transmission order corresponding to the transmission path based on the at least one priority information. One of processor 120 and communication processor 212/214 is configured to transmit data corresponding to the service identification information.

Figure 3:
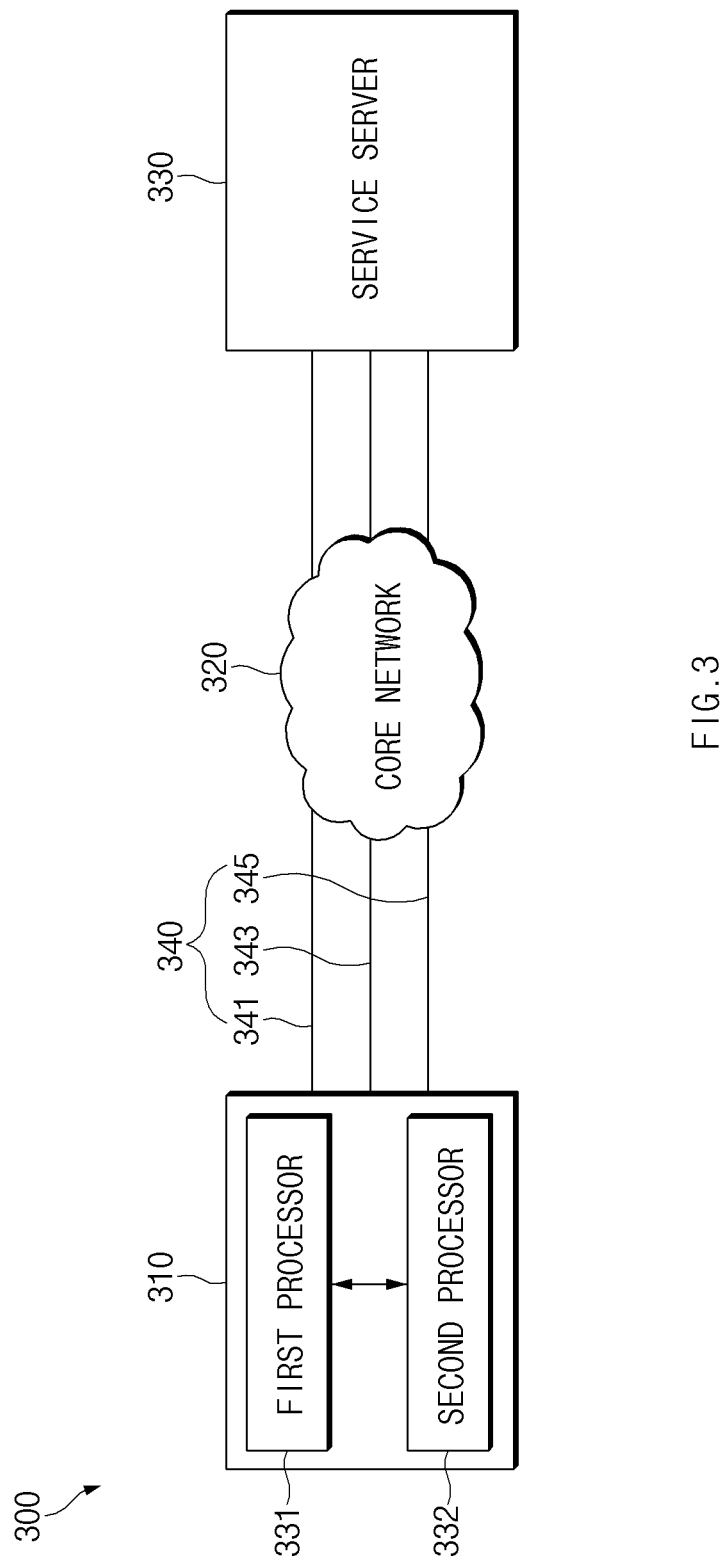
FIG. 3 is a block diagram illustrating a network system according to an embodiment.

FIG. 3 is a block diagram illustrating a network system 300 according to an embodiment.

Referring to FIG. 3, the network system 300 according to an embodiment may include an electronic device 310 (e.g., an electronic device 101 of FIG. 1), a core network (320), and a service server 330 (e.g., a server 108 of FIG. 1)

According to an embodiment, the service server 330 may transmit and receive data for a specified service (e.g., a content playback, game, or portal service) with the electronic device 310 over the core network 320. The service server 330 may include at least one of, for example, a content server, a game server, or a portal server. The core network 320 may be included in a second network 199 of FIG. 1 (e.g., a second cellular network 294 of FIG. 2). The core network 320 may include, for example, a $5^{th}$ generation core network (5GC).

According to an embodiment, the core network 320 (e.g., a router) may mediate communication between the service server 330 and the electronic device 310. For example, the core network 320 may logically or physically divide transmission paths 340 between the electronic device 310 and the service server 330 and may provide the electronic device 310 and the service server 330 with a plurality of transmission paths 341, 343, and 345. The core network 320 may control a priority (or data transmission quality) of data transmitted and received through each of the plurality of transmission paths 341, 343, and 345, based on path characteristic information of each of the plurality of transmission paths 341, 343, and 345. For example, the core network 320 may determine a priority of data transmitted and received through the plurality of transmission paths 341, 343, and 345, based on path characteristic information of the plurality of transmission paths 341, 343, and 345 and a specified network policy (e.g., a user equipment (UE) route selection policy (URSP)), and may control a transmission and reception priority of data passing through the plurality of transmission paths 341, 343, and 345 differentially in the determined priority.

According to an embodiment, the electronic device 310 may be connected with the service server 330 by at least one transmission path over the core network 320 to transmit and receive data corresponding to a specified service with the service server 330 through the at least one transmission path. The electronic device 310 may include a first processor 331 (e.g., a main processor 121 of FIG. 1 or a processor 120 of FIG. 2) configured to control an app corresponding to the specified service and a second processor 332 (e.g., a wireless communication module 192 of FIG. 1 or a second communication processor 214 of FIG. 2) configured to control transmission and reception of data through at least one transmission path. When at least one transmission path (e.g., the transmission path 341) connected with the service server 330 is established, the first processor 331 and the second processor 332 may identify path characteristic information of the established transmission path and may transmit and receive data corresponding to a specified service, in a priority determined based on information about a policy (e.g., a URSP) associated with data transmission quality and the path characteristic information.

According to certain embodiments, a base station device (not shown) which supports wireless communication of the electronic device 310 may be included between the electronic device 310 and the core network 320. The base station device may be included together with the core network 320 in a cellular network (e.g., a second network 199 of FIG. 1 or a second cellular network 294 of FIG. 2).

According to certain embodiments, the electronic device 310 may internally determine a data transmission order corresponding to at least one transmission path and may control a transmission and reception (or processing) priority of data adaptively depending on the policy associated with the data transmission quality.

Figure 4:
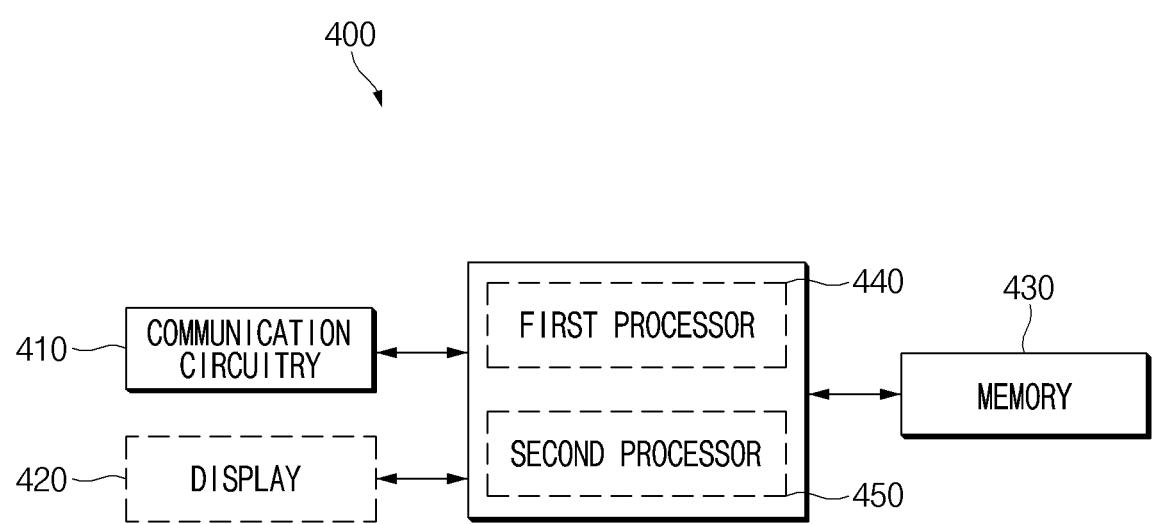
FIG. 4 is a block diagram illustrating a configuration of an electronic device according to an embodiment.

FIG. 4 is a block diagram illustrating a configuration of an electronic device (e.g., an electronic device 310 of FIG. 3) according to an embodiment.

Referring to FIG. 4, an electronic device 400 (e.g., an electronic device 101 of FIG. 1 or the electronic device 310 of FIG. 3) according to an embodiment may include a communication circuitry 410 (e.g., a communication module 190 of FIG. 1), a memory 430 (e.g., a memory 130 of FIG. 1), and processors 440 and 450 (e.g., a main processor 121 of FIG. 1 or a processor 120 of FIG. 2 and a wireless communication module 192 of FIG. 2 or a second communication processor 214 of FIG. 2). In an embodiment, the electronic device 400 may exclude some components or may further include an additional component. For example, the electronic device 400 may further include a display 420 (e.g., a display device 160 of FIG. 1). In an embodiment, some of the components of the electronic device 400 may be combined into one entity to perform functions of the components before the combination in the same manner.

According to an embodiment, the communication circuitry 410 may be configured to perform radio communication or establish a channel with a network of a specified communication mode (e.g., a second network 199 of FIG. 1). The network may include, for example, a new radio (NR) network (e.g., a second cellular network 294 of FIG. 2) and an LTE network (e.g., a first cellular network 292 of FIG. 2). The network may provide at least one transmission path (e.g., a transmission path 340 of FIG. 3). The transmission path may be established in units of at least one of a protocol data unit (PDU) session, a quality of service (QoS) flow, an internet protocol (IP) address, or an IP version 6 (IPv6) prefix.

According to an embodiment, the display 420 may display, for example, a variety of content (e.g., a text, an image, a video, an icon, and/or a symbol). The display 420 may include a touchscreen display combined with a touch sensor.

The memory 430 may store, for example, commands or data associated with at least one other component of the electronic device 400. The memory 430 may be a volatile memory (e.g., a random access memory (RAM)), a non-volatile memory (e.g., a read-only memory (ROM) or a flash memory), or a combination thereof. According to an embodiment, the memory 430 may store instructions, when executed, causing the second processor 450 to, when a transmission path (e.g., a transmission path 341 of FIG. 3) connected with an external electronic device (e.g., a service server 330 of FIG. 3) is established over the network, identify path characteristic information about the set transmission path (e.g., the transmission path 341 of FIG. 3) and service identification information about a service using the established transmission path (e.g., the transmission path 341 of FIG. 3), and causing at least one (e.g., a data receive processor) of the first processor 440 and the second processor 450 to identify at least one priority information mapped to the path characteristic information, based on priority information for each path characteristic and store priority related information for determining a data transmission priority corresponding the established transmission path (e.g., the transmission path 341 of FIG. 3) based on the at least one priority information in the memory 430, and causing at least one (e.g., a data transmit processor) of the first processor 440 and the second processor 450 to transmit data (e.g., internet packet data) corresponding to the service identification information to the data receive processor (e.g., the first processor 440 or the second processor 450), based on the priority related information.

Hereinafter, the data transmit processor shall be described as the first processor 440 while the data receive processor shall be described as the second processor 450. However, it shall be understood that the data transmit processor and the data receive processor can be either of the first processor or the second processor. In some embodiments, the data transmit processor and the data receive processor are different ones of the first processor 440 and the second processor 450.

According to an embodiment, the memory 430 may store priority information for each path characteristic of paths established over a network (e.g., the core network 320 of FIG. 3). When corresponding to at least one of, for example, a delay time from path characteristic information shorter than a specified time, local area data network (LADN) information from the path characteristic information, high continuity of the established transmission path (e.g., the transmission path 341 of FIG. 3) from the path characteristic information, a bandwidth established from the path characteristic information and exceeding a specified bandwidth, a specified session, or a specified IP address, the priority information for each path characteristic may be set to determine a relatively high priority (or a relatively quick data transmission order).

The priority information for each path characteristic may include, for another example, priority information mapped to each characteristic information. For example, the first highest priority may be mapped to slice/service type (SST) 2 in network slice information and QoS information of a delay critical guaranteed bit rate (GBR) class in QoS information, and the second highest priority may be mapped to the other path characteristic information. For another example, the priority information for each path characteristic may include priority information between a plurality of characteristic information and priority information according to details of the respective characteristic information. A priority for each SST value may be high in an order of 2, 1, and 3. A mobile edge computing (MEC) type in data network name (DNN) information may be higher in priority than an internet type. A session and service continuity (SSC) mode priority may be high in an order of SSC mode numbers 1, 3, and 2. The QoS information may have a priority according to 5G QoS indicator (5QI) information. The LADN information may be higher in priority than the DNN information. IPv6 multi-homming information may be details, which may include an IPv6 prefix. A prefix for MEC routing among the IPv6 prefixes may be higher in priority than the other prefixes.

According to an embodiment, the processors 440 and 450 may include the first processor 440 (e.g., the main processor 121 of FIG. 1) (e.g., a central processing unit or an app processor) and the second processor 450 (e.g., the wireless communication module 192 of FIG. 1) capable of operating independently of or together with the first processor 440. The first processor 440 may control an app run in the electronic device 400. The second processor 450 may control the communication circuitry 410 together with the first processor 440.

According to an embodiment, when URSP information is received from a core network 320 of FIG. 3 via the communication circuitry 410, the second processor 450 may set priority information for each path characteristic based on the URSP information and may store the set priority information for each path characteristic in the memory 430. The URSP information may include, for example, service identification information (e.g., a traffic descriptor) of a specific service, path characteristic information (e.g., a route selection descriptor) of the specific service, and/or priority information (e.g., rule precedence) corresponding to the specific service. The service identification information may include at least one of, for example, a data network name (DNN), a protocol ID, an application ID, or an IP packet filter. When there is previously stored priority information for each path characteristic in the memory 430, the second processor 450 may update the priority information for each path characteristic based on URSP information and may store the updated priority information for each path characteristic in the memory 430.

When a transmission path (e.g., the transmission path 341 of FIG. 3) connected with an external electronic device is established, the second processor 450 may assign path identification information about the established transmission path and may identify path characteristic information corresponding to the established transmission path and service identification information using the established transmission path.

The established transmission path may include at least one of a generated protocol data unit (PDU) session, a generated QoS flow, a newly assigned IP address, or a newly assigned IPv6 prefix. For example, the at least one processor (e.g., the second processor 450) may identify path characteristic information and/or service identification information based on data transmitted and received in a process of generating, updating, or deleting a session. For another example, the at least one processor (e.g., the second processor 450) may identify path characteristic information and/or service identification information based on data transmitted and received in a process of identifying addition, change, or deletion of a QoS flow. Based on the path characteristic information, the at least one processor may identify at least one priority based on priority information stored in the memory 430.

For example, the at least one processor (e.g., the second processor 450) may identify path characteristic information and/or service identification information based on data transmitted and received in a process of assigning an IP address or an IPv6 prefix. The path characteristic information may include at least one of, for example, network slice information, data network name (DNN) information, session and service continuity (SSC) mode information, QoS information, local area data network (LADN) information, IPv6 multi-homing information, or specified IP address information.

The network slice information may include a slice/service type (SST) value. The DNN information may include mobile an edge computing (MEC) type and an internet type. The SSC mode may include numbers 1, 2, and 3 of the SSC mode. The QoS information may include 5G QoS indicator (5QI) information (or QoS class information). The IPv6 multi-homing information may include an IPv6 prefix.

The second processor 450 may identify at least one priority information mapped to path characteristic information, based on priority information for each path characteristic, stored in the memory 430, and may determine a priority for the established transmission path (e.g., the transmission path 341 of FIG. 3) based on the at least one priority information. For example, when the at least one priority information is a plurality of priority information, the second processor 450 may determine the first highest priority among the plurality of priority information as the priority for the established transmission path (e.g., the transmission path 341 of FIG. 3).

According to an embodiment, the second processor 450 may map the determined priority related information with service identification information of a service which uses the established transmission path. The priority related information may include at least one of, for example, path identification information, priority information, or bandwidth related information.

According to an embodiment, when identifying data (hereinafter referred to as "transmit data") to be transmitted to the second processor 450, the first processor 440 may identify priority related information of the transmit data mapped with service identification information of the transmit data and may control a (transmission) priority (e.g., a data transmission order) of the transmit data based on priority related information (e.g., priority information) of the transmit data, while transmitting the transmit data to the second processor 450. For example, the first processor 440 may schedule a time taken to transmit the transmit data to the second processor 450 in a priority according to priority information in a weighted round robin scheme. For another example, the first processor 440 may control a (transmission) priority (e.g., a data transmission order) of the transmit data to ensure a bandwidth (e.g., at least one of a GBR or a maximum bit rate (MBR)) according to bandwidth related information based on priority related information (e.g., priority information and bandwidth related information) of the transmit data. Hereinafter, a description will be given of determining a priority (e.g., a data transmission order) for a transmission path (e.g., the transmission path 341 of FIG. 3) of the second processor 450 with reference to Tables 1 to 3 below.

TABLE 1

| Transmission path characteristic | Priority |
| --- | --- |
| Slicing Info. (SST 2) Delay critical GBR traffic | High |
| DNN for LAND/MEC GBR traffic | Mid |
| Default | Low |

Referring to Table 1 above, the priority information for each path characteristic according to an embodiment may include characteristic information (e.g., an SST value=2 and delay critical GBR traffic) mapped to a first priority (high) having the first highest priority, characteristic information (e.g., LAND, MEC, and GBR traffic) mapped to a second priority (mid) having the second highest priority, and characteristic information (e.g., default) mapped to a third priority (low) having the third highest priority.

TABLE 2

| Data transmission path | | Service identification information | Path characteristic information |
| --- | --- | --- | --- |
| MEC session | QoS Flow1 | Traffic filter: App = App 1, App2 dst ip = ip_1 | DNN = MEC, 5QI = 10 (Delay Critical GBR) |
| | QoS Flow2 | Traffic filter: App = App 1, App2 | DNN = MEC, 5QI = 3 (GBR) |
| Internet session | QoS Flow3 | Traffic filter: * | DNN = Internet, 5QI = 6 (Non-GBR) |

Referring to Tables 1 and 2 above, as connected with at least one external electronic device, the second processor 450 according to an embodiment may identify a first QoS flow (or a first transmission path) in an MEC session and a second QoS flow (or a second transmission path), and may assign first path identification information (e.g., QoS flow 1) and second path identification information (e.g., QoS flow 2) to the first QoS flow and the second QoS flow, respectively.

The second processor 450 may identify first service identification information (e.g., identification information (App1) of a first app, identification information (App2) of a second app, and a destination IP address (ip_1)) corresponding to the first QoS flow and first characteristic information (e.g., DNN=MEC and 5QI=10). The second processor 450 may identify second service identification information (e.g., identification information (App1) of a first app, identification information (App2) of a second app, and second characteristic information (DNN=MEC and 5QI=3)) corresponding to the second QoS flow (or the second transmission path). Furthermore, as connected with the at least one external electronic device, the second processor 450 may identify a third QoS flow (or a third transmission path) in the internet session and may assign third path identification information (e.g., QoS flow 3) to the third QoS flow. The second processor 450 may identify third service identification information (e.g., unspecified) corresponding to the third QoS flow and third characteristic information (e.g., DNN=internet and 5QI=6).

TABLE 3

| Data transmission path | | Service identification information | Path characteristic information | Priority |
|---|---|---|---|---|
| MEC session | QoS Flow1 | Traffic filter: App = App1, App2 dst ip = ip_1 | DNN = MEC, 5QI = 10 (Delay Critical GBR) | High |
| | QoS Flow2 | Traffic filter: App = App1, App2 | DNN = MEC, 5QI = 3 (GBR) | Mid |
| Internet session | QoS Flow3 | Traffic filter: * | DNN = Internet, 5QI = 6 (Non-GBR) | Low |

Referring to Tables 1 to 3 above, the second processor 450 according to an embodiment may identify delay critical GBR information from first characteristic information corresponding to the first QoS information and may determine the first QoS flow as a first priority (e.g., high or the first highest priority) in a priority mapped to the delay critical GBR information. The second processor 450 may identify GBR information from second characteristic information corresponding to the second QoS flow and may determine the second QoS flow as a second priority (e.g., mid or the second highest priority) in a priority mapped to the GBR information. As the second processor 450 does not identify characteristic information mapped to the first priority and the second priority from the second characteristic information corresponding to the second QoS flow, it may determine the third QoS flow as a third priority (e.g., low or the third highest priority). The second processor 450 may map the first to third service identification information with the first to third priorities, respectively. Thereafter, when transmitting data corresponding to the first service identification information to the second processor 450, the first processor 440 may transmit the data corresponding to the first service identification information to the second processor 450 in the first priority mapped to the first service identification information. For example, while transmitting the data corresponding to the first service identification information to the second processor 450, the first processor 440 may control a priority of the data corresponding to the first service identification information to ensure a delay of less than a specified time according to the first priority. For another example, when transmitting the data corresponding to the first service identification information to the second processor 450, the first processor 440 may control a priority of the data corresponding to the first service identification information to ensure a bandwidth (e.g., a GBR) according to the first priority. The first processor 440 may transmit data corresponding to the second service identification information to the second processor 450 in the second priority mapped to the second service identification information. For example, while transmitting the data corresponding to the second service identification information to the second processor 450, the first processor 440 may control a priority of the data corresponding to the first service identification information to ensure a bandwidth (e.g., a GBR) according to the second priority. Furthermore, the first processor 440 may transmit data corresponding to the third service identification information to the second processor 450 in the third priority mapped to the third service identification information. For example, while transmitting the data corresponding to the third service identification information to the second processor 450, the first processor 440 may control a priority of the data corresponding to the third service identification information to ensure at least one of a delay or a bandwidth of the data corresponding to the first service identification information and the second service identification information.

According to an embodiment, when the path characteristic information is changed by at least one of the display 420 (or a user interface) or an app which establishes the transmission path (e.g., the transmission path 341 of FIG. 3), the second processor 450 may redetermine a priority (e.g., a data transmission order) for the transmission path (e.g., the transmission path 341 of FIG. 3) based on the changed characteristic information. Furthermore, when UE route selection policy (URSP) information is received over a network, the second processor 450 may update priority information for each path characteristic depending on the received URSP information. The second processor 450 may redetermine a priority for a path based on the updated priority information for each path characteristic and the path characteristic information. When the priority for the transmission path (e.g., the transmission path 341 of FIG. 3) is redetermined, the second processor 450 may re-map the service identification information with the redetermined priority. Thereafter, the first processor 440 may transmit the data corresponding to the service identification information to the second processor 450 in the priority mapped to the service identification information.

According to an embodiment, when the established transmission path (e.g., the transmission path of FIG. 3) is released, the second processor 450 or the second processor 450 may delete priority related information and path identification information about the established transmission path (e.g., the transmission path of FIG. 3) from the memory 430.

According to certain embodiments, the first processor 440 may receive the data corresponding to the service identification information from the second processor 450 or may transmit the data corresponding to the service identification information to the second processor 450, depending on the priority related information mapped to the service identification information. In certain embodiments, a priority mapped to the service identification information may be set differently when transmitted from the first processor 440 to the second processor 450 and when received at the first processor 440 from the second processor 450.

According to certain embodiments, the second processor 450 may identify path characteristic information about the established transmission path (e.g., the transmission path of FIG. 3) and/or service identification information and may transmit the path characteristic information and/or the service identification information together with path identification information about the established transmission path (e.g., the transmission path of FIG. 3) to the first processor 440. In this case, the first processor 440 may determine priority related information about the transmission path (e.g., the transmission path of FIG. 3) based on the path characteristic information and may transmit the priority related information to the second processor 450. The second processor 450 may control a priority of data to be transmitted to the first processor 440 based on the priority related information. Similarly, when the second processor 450 is the second processor 450, the second processor 450 may identify path characteristic information about the established transmission path (e.g., the transmission path of FIG. 3) and/or service identification information, may identify at least one priority information mapped to the path characteristic information based on priority information for each patch characteristic, and may determine priority information about the transmission path (e.g., the transmission path of FIG. 3) among the at least one priority information. In this case, the second processor 450 may transmit the path identification information, the service identification information, and the priority related information to the first processor 440. The first processor 440 may receive the priority related information from the second processor 450 and may control a priority of the transmit data based on the priority related information when transmitting the data corresponding to the service identification information to the second processor 450.

According to the above-mentioned embodiment, the electronic device 400 may control a priority (e.g., a data transmission order) of transmit and receive data between the first processor 440 and the second processor 450 based on a characteristic for each path. The electronic device 400 may provide transmission quality adaptively to a service or app. Thus, the electronic device 400 may internally support the satisfaction of transmission quality of data transmitted and received over the network.

Figure 5:
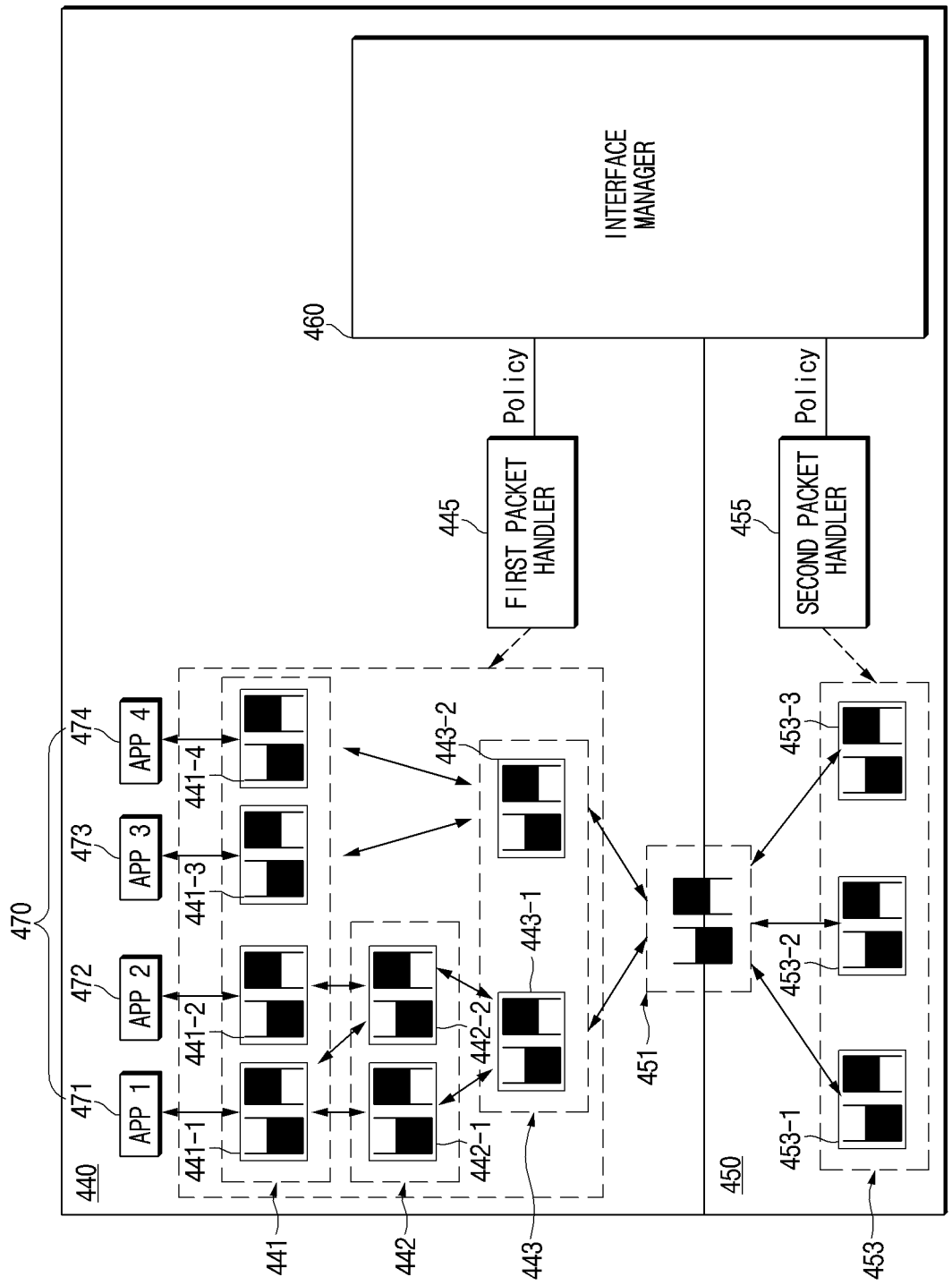
FIG. 5 is a block diagram illustrating a functional configuration of a processor according to an embodiment.

FIG. 5 is a block diagram illustrating a functional configuration of a processor according to an embodiment.

Referring to FIG. 5, processors 440 and 450 (e.g., a processor 120 of FIG. 2 and a second communication processor 214 of FIG. 2) may execute an interface manager 460, a first packet handler 445, and a second packet handler 455. The interface manager 460, the first packet handler 445, and the second packet handler 455 may be software modules configured with instructions, at least some of which include queues. The processors 440 and 450 may load instructions or data stored in a memory (e.g., a memory 430 of FIG. 4) to execute the software modules. The interface manager 460 may be executed by at least one of the first processor 440 or the second processor 450. The first packet handler 445 may be executed by the first processor 440, and the second packet handler 455 may be executed by the second processor 450. In FIG. 5, a description will be given of an example of controlling a priority of transmit and receive data in priorities determined as Table 3 above.

According to an embodiment, the interface manager 460 may identify path characteristic information about an established transmission path (e.g., the transmission path 341 of FIG. 3) and/or service identification information. The interface manager 460 may identify at least one priority mapped to path characteristic information, based on priority information for each path characteristic, stored in the memory (e.g., the memory 430 of FIG. 4), and may determine a priority (e.g., a data transmission order) for the established transmission path based on the at least one priority, thus storing priority related information in the memory 430.

According to an embodiment, the first packet handler 445 may generate a plurality of group queues 441, 442, and 443. The first group queues 441 may be to transmit and receive application (App 1 471 . . . App 4 474) data. The second group queues 442 may transmit and receive data of respective QoS flows. The third group queues 443 for transmitting and receiving data of respective sessions (e.g., an internet session and an MEC session).

The first packet handler 445 may generate the first group queues 441 (e.g., a socket buffer) for transmitting and receiving data of each app 470 which is running. The first group queues 441 may include first queues 441-1 where data of a first app (or application) (APP1) 471 is input/output, second queues 441-2 where data of a second app (APP2) 472 is input/output, third queues 441-3 where data of a third app (APP3) 473 is input/output, and fourth queues 441-4 where data of a fourth app (APP4) 474 is input/output.

The first packet handler 445 may generate second group queues 442 (e.g., an IP packet filter) for transmitting and receiving data of respective QoS flows. The second group queues 442 may include fifth queues 442-1 where data of a first QoS flow is input and output and sixth queues 442-2 where data of a second QoS flow is input and output.

The first packet handler 445 may generate third group queues (e.g., a transmit queue) for transmitting and receiving data of respective sessions (e.g., an internet session and an MEC session). The third group queues 443 may include seventh queues 443-1 where data of the MEC session is input and output and eighth queues 443-2 where data of the internet session is input and output.

According to an embodiment, each of the first app 471, the second app 472, the third app 473, and the fourth app 474 may deliver transmit data to a queue for transmission among the first queues 441-1, the second queues 441-2, the third queues 441-3, and the fourth queues 441-4. Furthermore, each of the first app 471, the second app 472, the third app 473, and the fourth app 474 may receive data from a queue for reception among the first queues 441-1, the second queues 441-2, the third queues 441-3, and the fourth queues 441-4.

According to an embodiment, the first packet handler 445 may deliver data to be transmitted through the first QoS flow among data input to the first queues 441-1 and the second queues 441-2 to the fifth queues 442-1 and may deliver data to be transmitted through the second QoS flow among data input to the first queues 441-1 and the second queues 441-2 to the sixth queues 442-2.

According to an embodiment, the first packet handler 445 may deliver transmit data input to the fifth queues 442-1, the sixth queues 442-2, the third queues 441-3, and the fourth queues 441-4 to the third group queues 443, such that the fifth queues 442-1 have the first highest priority, the sixth queues 442-2 have the second highest priority, and the third queues 441-3 and the fourth queues 441-4 have the third highest priority. For example, the first packet handler 445 may first deliver data of the fifth queues 442-1 to the seventh queues 443-1, may then deliver data of the sixth queues 442-2 to the seventh queues 443-1, and may then deliver data of the third queues 441-3 and the fourth queues 441-4 to the eighth queues 443-2. Similarly, the first packet handler 445 may deliver receive data input to the fifth queues 442-1, the sixth queues 442-2, and the eighth queues 443-2 to the first group queues 441, such that the fifth queues 442-1 have the first highest priority, the sixth queues 442-2 have the second highest priority, and the eighth queues 443-2 have the third highest priority. For example, the first packet handler 445 may first deliver data of the fifth queues 442-1 to the first queues 441-1, may then deliver data of the sixth queues 442-2 to the second queues 441-2, and may then deliver data of the eighth queues 443-2 to the third queues 441-3 or the fourth queues 441-4.

According to an embodiment, the first packet handler 445 may prioritize the third group queues 443 in a descending order of the seventh queues 443-1 and the eighth queues 443-2 to transmit data input to the seventh queues 443-1 and the eighth queues 443-2 to the second processor 450 via interface queues 451. For example, the first packet handler 445 may first deliver data of the seventh queues 443-1 to the interface queues 451 and may then deliver data of the eighth queues 443-2 to the interface queues 451. Similarly, the first packet handler 445 may prioritize the third group queues 443 in a descending order of the seventh queues 443-1 and the eighth queues 443-2 to deliver receive data input to the seventh queues 443-1 and the eighth queues 443-2 to the second group queues 442. For example, the first packet handler 445 may first deliver data of the seventh queues 443-1 to the fifth queues 442-1 or the sixth queues 442-2. Thereafter, the first handler 445 may deliver data of the second group queues 442 to the first group queues 441 and may deliver data of the eighth queues 443-2 to the third queues 441-3 or the fourth queues 441-4.

According to an embodiment, the second packet handler 455 may generate ninth queues 453-1, tenth queues 453-2, and eleventh queues 453-3 where the first to third QoS flows are input and output. The second packet handler 455 may prioritize fourth group queues 453 in a descending order of the ninth queues 453-1, the tenth queues 453-2, and the eleventh queues 453-3 to deliver transmit data input to the ninth queues 453-1, the tenth queues 453-2, and the eleventh queues 453-3 to a communication circuitry (e.g., a communication circuitry 410 of FIG. 4). Similarly, The second packet handler 455 may prioritize the fourth group queues 453 in a descending order of the ninth queues 453-1, the tenth queues 453-2, and the eleventh queues 453-3 to deliver receive data input to the ninth queues 453-1, the tenth queues 453-2, and the eleventh queues 453-3 to the first processor 440 via the interface queues 451.

According to certain embodiments, the first packet hander 445 may fail to separately generate the third group queues 443 and may deliver transmit data input to the fifth queues 442-1, the sixth queues 442-2, the third queues 441-3 and fourth queues 441-4 to the interface queues 451, such that the fifth queues 442-1 have the first highest priority, the sixth queues 442-2 have the second highest priority, and the third and fourth queues 441-3 and 441-4 have the third highest priority. Furthermore, the first packet hander 445 may deliver receive data input to the fifth queues 442-1, the sixth queues 442-2, the third queues 441-3 and fourth queues 441-4 to the first to fourth apps 471 to 474, such that the fifth queues 442-1 have the first highest priority, the sixth queues 442-2 have the second highest priority, and the third and fourth queues 441-3 and 441-4 have the third highest priority. Alternatively, the first packet handler 445 may fail to separately generate the second group queues 442 and may transmit and receive data in priorities determined based on the first group queues 441 and the third group queues 443.

According to certain embodiments, only the first processor 440 may control a (processing) priority of data transmitted to the second processor 450, or only the second processor 450 may control a priority of data transmitted to the first processor 440.

Figure 6:
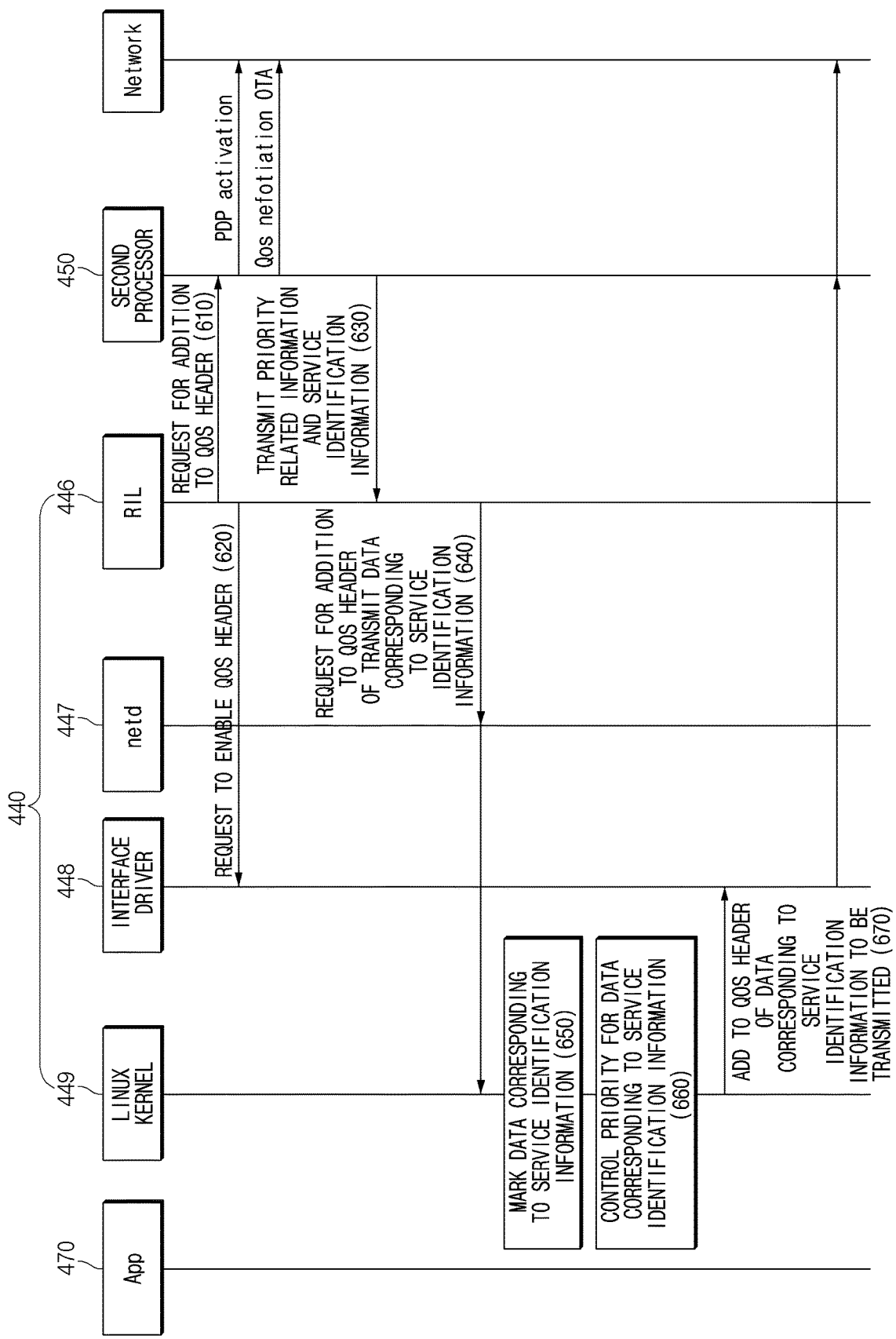
FIG. 6 is a signal sequence diagram illustrating a process according to an embodiment.

FIG. 6 is a signal sequence diagram illustrating a process according to an embodiment.

Referring to FIG. 6, a first processor 440 (e.g., a processor 120 of FIG. 2) may execute a radio interface layer (RIL) 446, a network device (NETD) 447, an interface driver 448, and a Linux kernel 449. The RIL 446, the network device (NETD) 447, and the interface driver 448 may correspond to at least a part of an interface manager 460 of FIG. 5, and the Linux kernel 449 may correspond to at least a part of a first packet handler 445 of FIG. 5. The RIL 446, the NETD 447, the interface driver 448, and the Linux kernel 449 may be software modules configured with instructions, at least some of which may include queues. The first processor 440 may load instructions or data stored in a memory (e.g., a memory 430 of FIG. 4) to execute the software modules.

In operation 610, the RIL 446 may transmit, for example, a request associated with adding path characteristic information to a QoS header of data received from a transmission path 340 of FIG. 3 at a booting time.

In operation 620, the RIL 446 may transmit, for example, a request associated with enabling the QoS header to the interface driver 448 at the booting time. The QoS header may include, for example, a region capable of adding path identification information.

In operation 630, a second processor 450 (e.g., a second communication processor 214 of FIG. 2) may identify path characteristic information about a transmission path (e.g., a transmission path 341 of FIG. 3) established over a network and may determine a priority for the transmission path (e.g., a transmission path 341 of FIG. 3) based on priority information for each path characteristic. The second processor 450 may add and transmit priority related information and service identification information to the QoS head of the receive data to the first processor 440. The priority related information may further include, for example, bandwidth related information (e.g., a GBR or maximum bit rate (MRB)) other than path identification information (e.g., a flow ID) and priority information. The priority information may include a priority assigned (or determined) for a transmission path or service identification information. The service identification information may include, for example, a destination address (e.g., an IP address and a port address).

According to an embodiment, in operation 640, when receiving data from the second processor 450, the RIL 446 may transmit a request to add the received data to a QoS header of data corresponding to the service identification information to the Linux kernel 449 via the NETD 447. As the RIL 446 does not have root authority, because it is unable to directly communicate with the Linux kernel 449, it may transmit the request associated with addition to the QoS header to the Linux kernel 449 via the NETD 447. When receiving the request associated with the addition to the QoS header from the RIL 446, the NETD 447 may convert the request associated with the addition to the QoS header into a form analyzable by the Linux kernel 449 and may transmit the converted request associated with the addition to the QoS header to the Linux kernel 449.

According to an embodiment, when receiving the request for the addition to the QoS header via the NETD 447, in operation 650, the Linux kernel 449 may mark path identification information (e.g., a flow ID) on data (e.g., a packet) corresponding to service identification information to be transmitted to the second processor 450 using an IP table command. For example, the Linux kernel 449 may mark the path identification information "0x8b2ad928" on data, a destination IP address of which is 172.16.145.9/32, or a protocol type of which is 6 or 17 and a destination port of which is 12000:12999, among data passing through an output chain using a mangle table shown in Table 4 below.

TABLE 4 iptables -t mangle -N qos_0x8b2ad928.0
iptables -t mangle -A qos_0x8b2ad928.0 --dst 172.16.145.9/32 --protocol 1 -j MARK --set-mark 0x8b2ad928
iptables -t mangle -N qos_0x8b2ad928.1
iptables -t mangle -A qos_0x8b2ad928.1 --protocol 6 --dport 12000:12999 -j MARK --set-mark 0x8b2ad928
iptables -t mangle -A qos_0x8b2ad928.1 --protocol 17 --dport 12000:12999 -j MARK --set-mark 0x8b2ad928
iptables -t mangle -A OUTPUT -j qos_0x8b2ad928.0
iptables -t mangle -A OUTPUT -j qos_0x8b2ad928.1

According to an embodiment, in operation 660, the Linux kernel 449 may set priority related information using a TC command in the data on which the path identification information "0x8b2ad928" is marked. For example, the Linux kernel 449 may deliver the data on which the "0x8b2ad928" is marked to class ID 1:30 and may apply priority information 4 corresponding to the priority related information, bandwidth GBR 1152000 bit, and GBR 1152000 bit to the class. Thereafter, the Linux kernel 449 may control a priority of transmit data using a plurality of group queues (e.g., first to third group queues 441 to 443 of FIG. 5) based on specified priority related information. For example, the Linux kernel 449 may prioritize transmit data (e.g., the data corresponding to the service identification information) on which the "0x8b2ad928" is marked as the fourth highest priority and may control a priority of the transmit data (e.g., control transmission and reception scheduling of data) to ensure bandwidth GBR 1152000 bit and GBR 1152000 bit.

TABLE 5 tc class add dev rmnet0 parent 1:1 classid 1:30 htb prio 4 rate 1152000bit ceil 1152000bit
tc qdisc add dev rmnet0 parent 1:30 handle 30:0 prio flow enable
tc filter add dev rmnet0 parent 1:0 prio 1 protocol ip handle 0x8b2ad928 fw classid 1:30

According to an embodiment, when receiving data from the Linux kernel 449, in operation 670, the interface driver 448 may identify the path identification information based on the priority related information marked on the data and may add and transmit the identified path identification information to the QoS header to the second processor 450. Thereafter, the second processor 450 may identify the priority related information mapped with the path identification information and may control a priority of the transmit data based on the priority related information when transmitting the data to the network via a communication circuitry 410 of FIG. 4.

Figure 7:
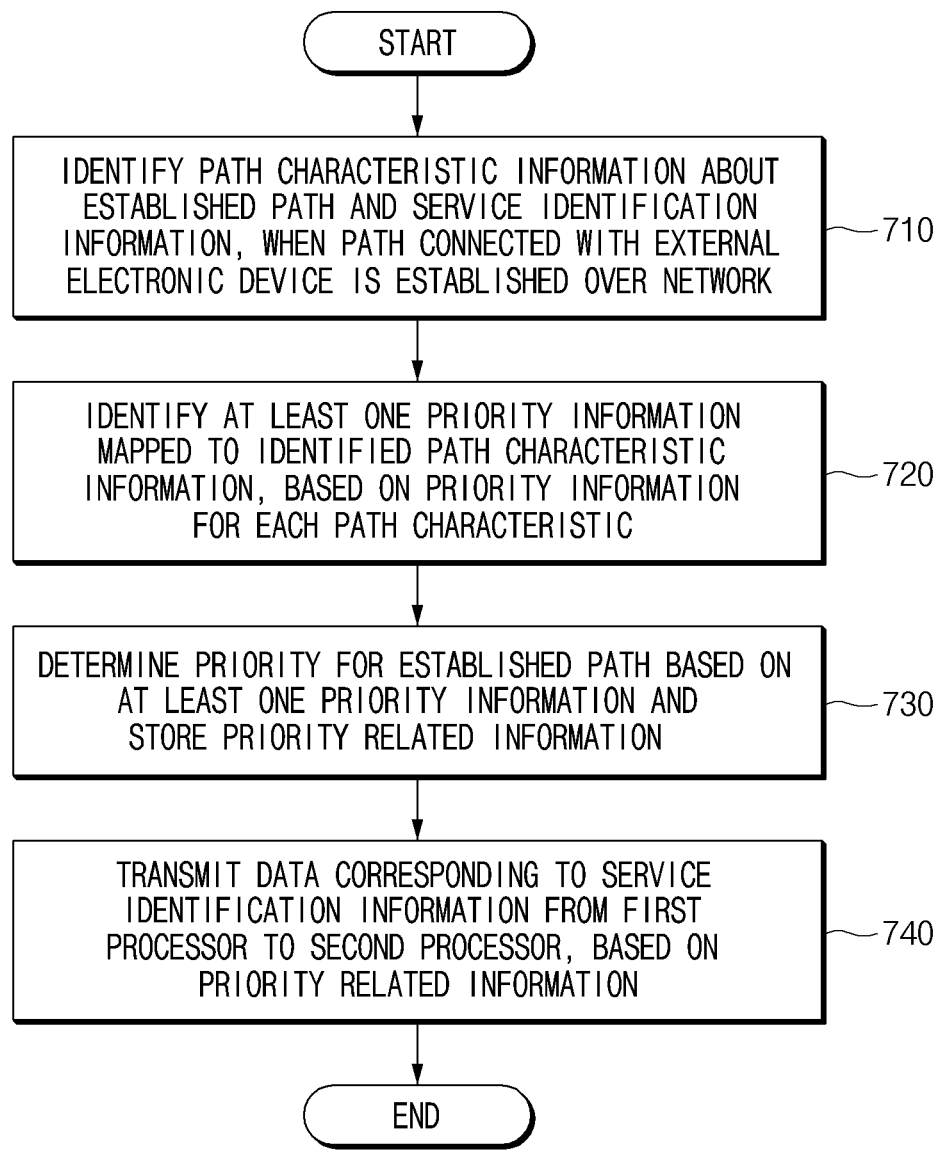
FIG. 7 is a flowchart illustrating a method for controlling data transmission according to an embodiment.

FIG. 7 is a flowchart illustrating a method for controlling data transmission according to an embodiment.

Referring to FIGS. 5 and 7, according to an embodiment, in operation 710, when a transmission path (e.g., a transmission path 341 of FIG. 3) connected with an external electronic device is established over a network, a second processor 450 (e.g., a second communication processor 214 of FIG. 2) may identify path characteristic information about the established transmission path (e.g., the transmission path 341 of FIG. 3) and service identification information about a service using the established transmission path (e.g., the transmission path 341 of FIG. 3).

According to an embodiment, in operation 720, at least one processor (e.g., a second processor 450) may identify at least one priority information mapped to the path characteristic information, based on priority information for each path characteristic, stored in a memory.

According to an embodiment, in operation 730, the second processor 450 may determine a priority (e.g., a data transmission order) for the established transmission path (e.g., the transmission path 341 of FIG. 3) based on the at least one priority information and may store the determined priority related information.

According to an embodiment, when a data transmit processor is a first processor 440, in operation 740, the first processor 440 may transmit data corresponding to the service identification information to the second processor 450 based on the priority related information. Similarly, when the data transmit processor is the second processor 450, the second processor 450 may transmit the data corresponding to the service identification information to the first processor 440 based on the priority related information.

According to certain embodiments, an electronic device 310 of FIG. 3 may internally control a transmission and reception (or processing) priority of data adaptively depending on a policy associated with data transmission quality for at least one transmission path (e.g., the transmission path 341 of FIG. 2).

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to certain embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may differentially control data transmission quality depending on characteristics of a transmission path established over the network. In addition, various effects directly or indirectly ascertained through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuitry configured to transmit and receive data with an external electronic device over a network;
   a first processor configured to transmit and receive data with the external electronic device via the communication circuitry;
   a second processor configured to be operatively connected with the communication circuitry and the first processor and control the communication circuitry; and
   a memory configured to store priority information for each path characteristic of paths established over the network,
   wherein the second processor is configured to:
      identifying path characteristic information about a transmission path and/or service identification information about a service using the transmission path and storing priority information for each path characteristic of the transmission path in the memory when the transmission path connected with the external electronic device is established over the network,
   wherein a first one of the first processor and the second processor is configured to:
      identify at least one priority information mapped to the path characteristic information, based on the priority information for each path characteristic in the memory; and
      store priority related information for determining a data transmission order between the first processor and the second processor based on the at least one priority information, and
   wherein a second one of the first processor and the second processor is configured to:
      transmit data corresponding to the service identification information to the first one of the first processor and the second processor based on the priority related information.

2. The electronic device of claim 1, wherein the priority related information is set differently according to when the data corresponding to the service identification information is transmitted from the first processor to the second processor or when the data corresponding to the service identification information is transmitted from the second processor to the first processor.

3. The electronic device of claim 1, wherein the transmission path includes at least one of a generated protocol data unit (PDU) session, a generated quality of service (QoS) flow, a newly assigned internet protocol (IP) address, or a newly assigned IP version 6 (IPv6) prefix.

4. The electronic device of claim 1, wherein the service identification information includes at least one of a data network name (DNN), an application ID, or an IP packet filter.

5. The electronic device of claim 1, wherein the path characteristic information includes at least one of network slice information, DNN information, session and service continuity (SSC) mode information, QoS information, local area data network (LADN) information, IPv6 multi-homming information, or specified IP address information.

6. The electronic device of claim 1, wherein the priority information for each path characteristic is set to determine a high priority, when corresponding to at least one of when identifying a delay time shorter than a specified time from the path characteristic information, when identifying LADN information from the path characteristic information, when identifying that continuity of the established path is high from the path characteristic information, when identifying that a bandwidth exceeding a specified bandwidth is established from the path characteristic information, when identifying a specified session, or when identifying a specified IP address.

7. The electronic device of claim 1, wherein the data receive processor is configured to:
when the at least one priority information is a plurality of priority information, determine a first highest priority among the plurality of priority information.

8. The electronic device of claim 1, wherein the priority related information includes bandwidth related information,
wherein the first one of the first processor and second processor is configured to:
determine the data transmission order to ensure a bandwidth according to the bandwidth related information, and
wherein the second one of the first processor and second processor is configured to:
transmit the data corresponding to the service identification information to the first one of the first processor and second processor in the data transmission order.

9. The electronic device of claim 1, wherein the first one of the first processor and second processor is configured to:
when the path characteristic information is changed through at least one of a user interface or an app establishing the transmission path, redetermine the data transmission order based on the changed path characteristic information.

10. The electronic device of claim 1, wherein the second processor is configured to:
when user equipment (UE) route selection policy (URSP) information is received over the network, update the priority information for each path characteristic based on the URSP information, and
wherein the first one of the first processor and second processor is configured to:
redetermine the data transmission order based on the updated priority information for each path characteristic.

11. The electronic device of claim 1, wherein the second processor or the first one of the first processor and second processor is configured to:
when the transmission path is released, delete the priority related information stored in the memory.

12. A method for controlling data transmission in an electronic device comprising a first processor and a second processor, the method comprising:
when a transmission path connected with an external electronic device is established over a network, identifying, by the second processor, path characteristic information about the transmission path and service identification information about a service using the transmission path;
identifying, by a first one of the first processor and the second processor, at least one priority information mapped to the path characteristic information, based on priority information for each path characteristic, the priority information being stored in a memory;
storing, by the first one of the first processor and the second processor, priority related information for determining a data transmission order between the first processor and the second processor based on the at least one priority information in the memory; and
transmitting, by a second one of the first processor and the second processor, data corresponding to the service identification information to the first one of the first processor and the second processor based on the priority related information.

13. The method of claim 12, wherein the priority related information is set differently according to when the data corresponding to the service identification information is transmitted from the first processor to the second processor or when the data corresponding to the service identification information is transmitted from the second processor to the first processor.

14. The method of claim 12, wherein the transmission path includes at least one of a generated protocol data unit (PDU) session, a generated quality of service (QoS) flow, a newly assigned IP address, or a newly assigned IPv6 prefix.

15. The method of claim 12, wherein the service identification information includes at least one of a data network name (DNN), an application ID, or an IP packet filter.

16. The method of claim 12, wherein the path characteristic information includes at least one of network slice information, DNN information, session and service continuity (SSC) mode information, QoS information, local area data network (LADN) information, IPv6 multi-homming information, or specified IP address information.

17. The method of claim 12, wherein the priority information for each path characteristic is set to determine a high priority, when corresponding to at least one of a delay time shorter than a specified time from the path characteristic information, LADN information from the path characteristic information, high continuity of the established path from the path characteristic information, a bandwidth exceeding a specified bandwidth is established from the path characteristic information, a specified session, or a specified IP address.

18. The method of claim 12, wherein the determining includes:
when the at least one priority information is a plurality of priority information, determining a first highest priority among the plurality of priority information.

19. The method of claim 12, wherein the priority related information includes bandwidth related information,
wherein the transmitting includes:

determining, by the first one of the first processor and the second processor, the data transmission order to ensure a bandwidth according to the bandwidth related information; and transmitting, by the second one of the first processor and the second processor, the data corresponding to the service identification information to the first one of the first processor and the second processor in the data transmission order.

20. The method of claim 12, further comprising:

when UE route selection policy (URSP) information is received over the network, updating the priority information for each path characteristic based on the URSP information; and redetermining a priority for the established path based on the updated priority information for each path characteristic.

* * * * *